United States Patent
No et al.

(10) Patent No.: US 8,699,400 B2
(45) Date of Patent: Apr. 15, 2014

(54) SOURCE ANTENNA SWITCHING SCHEME FOR NON-ORTHOGONAL PROTOCOL

(75) Inventors: Jong-Seon No, Seoul (KR); Dong-Joon Shin, Seoul (KR); Xianglan Jin, Seoul (KR); Jae-Dong Yang, Seoul (KR)

(73) Assignee: SNU R&DB Foundation, Seoul (KR)

( * ) Notice: Subject to any disclaimer, the term of this patent is extended or adjusted under 35 U.S.C. 154(b) by 1225 days.

(21) Appl. No.: 12/571,771

(22) Filed: Oct. 1, 2009

(65) Prior Publication Data
US 2010/0296433 A1 Nov. 25, 2010

(30) Foreign Application Priority Data
May 20, 2009 (KR) .......... 10-2009-0044200

(51) Int. Cl.
H04B 7/14 (2006.01)
(52) U.S. Cl.
USPC .......................................... 370/315; 370/215
(58) Field of Classification Search
USPC ............... 370/215, 315, 334, 464, 465, 319; 455/101, 102, 103
See application file for complete search history.

(56) References Cited

U.S. PATENT DOCUMENTS 8,089,916 B2 * 1/2012 Gulasekaran et al. ........ 370/315
8,233,558 B2 * 7/2012 Sirkeci et al. ................. 375/267

FOREIGN PATENT DOCUMENTS

EP 1883178 A2 * 1/2008

OTHER PUBLICATIONS

Laneman et al, "Distributed Space-Time-Coded Protocols for Exploiting Cooperative Diversity in Wireless Networks", IEEE Transactions on Information Theory, vol. 49, No. 10, Oct. 2003, pp. 2415-2425.
Jing et al, "Distributed Space-Time Coding in Wireless Relay Networks", IEEE Transactions on Wireless Communications, vol. 5, No. 12, Dec. 2006, pp. 3524-3536.
Jing et al, "Using Orthogonal and Quasi-Orthogonal Designs in Wireless Relay Networks", IEEE Transactions on Information Theory, vol. 53, No. 11, Nov. 2007, pp. 4106-4118.
Maham et al, "Distributed GABBA Space-Time Codes in Amplify-and-Forward Cooperation", UniK—University Graduate Center, University of Oslo, Oslo, Norway, 5 pages.
Jing et al, "Cooperative Diversity in Wireless Relay Networks with Multiple-Antenna Nodes", Department of Electrical Engineering California Institute of Technology, 5 pages.
Susinder Rajan et al,, "A Non-orthogonal Distributed Space-Time Coded Protocol Part I: Signal Model and Design Criteria", Proceedings of 2006 IEEE Information Theory Workshop (ITW'06), pp. 385-389.

* cited by examiner

Primary Examiner — Ian N Moore
Assistant Examiner — Thai Nguyen
(74) Attorney, Agent, or Firm — Renner, Otto, Boisselle & Sklar, LLP

(57) ABSTRACT

The present invention relates to a source antenna switching scheme for a non-orthogonal protocol; and more particularly, to a source antenna switching scheme for a non-orthogonal protocol, which transmits a signal of a source node to a destination node through a relay node. The present invention provides a source antenna switching scheme for a non-orthogonal decode-and-forward protocol that can acquire a greater diversity than the conventional NDF protocol. In other words, the present invention provides a source antenna switching scheme for a non-orthogonal decode-and-forward protocol that can increase a diversity order by adding a reasonable priced antenna instead of expensive hardware such as an RF chain when there are a plurality of antenna in the RF chain.

4 Claims, 5 Drawing Sheets

SOURCE ANTENNA SWITCHING SCHEME FOR NON-ORTHOGONAL PROTOCOL

CROSS-REFERENCE TO RELATED APPLICATION

This application claims priority to Korean Patent Application No. 10-2009-0044200 filed on May 20, 2009, the entire contents of which are hereby incorporated by reference.

FIELD OF THE INVENTION

The present invention relates to a source antenna switching scheme for a non-orthogonal protocol; and more particularly, to a source antenna switching scheme for a non-orthogonal protocol, which transmits a signal of a source node to a destination node through a relay node.

BACKGROUND OF THE INVENTION

Typically, in the radio communication system, a space diversity can be acquired through multiple independent paths between transmitters (source nodes) and receivers (destination nodes) that are relative to space-time codes (STC). Further, if a relay node is used, there are additional independent paths between the transmitters and the receivers, penetrating the relay node. Such a system is called a cooperative network. In this case, a cooperative diversity is acquired. In a two-phase cooperative protocol of the cooperative network, the source node transmits signals to the relay node or the destination node at a first phase (or timeslot) and the relay node transmits signals to the destination node at a second phase. The protocol is called a non-orthogonal protocol or an orthogonal protocol according to whether the source node continually performs the transmission at the second phase.

Recently, studies on the cooperative network have been widely conducted. In a paper, J. N. Laneman and G. W. Wornell, "Distributed space-time-coded protocols for exploiting cooperative diversity in wireless networks," IEEE Trans. Inform. Theory, vol. 49, pp. 2415~2425, October 2003, repetition and space-time algorithms has been suggested to acquire the cooperative diversity. Moreover, in a document, Y. Jing and B. Hassibi, "Distributed space-time coding in wireless relay networks," IEEE Trans. Wireless Commun., vol. 5, no. 12, pp. 3524~3536, December 2006, a distributed STC (DSTC) for an amplify-and-forward (AF) protocol by using a two-hop system has been suggested. If transmission power is infinitely great, in the scheme, when R relay nodes are used, the diversity order R is acquired. In a paper, Y. Jing and H. Jafarkhani, "Using orthogonal and quasi-orthogonal design in wireless relay networks," IEEE Trans. Inform. Theory, vol. 53, no. 11, pp. 4106~4118, November 2007, practical DSTCs has been designed by using orthogonal space-time block codes (OSTBCs) and quasi-orthogonal space-time block codes (QOSTBCs) for the AF protocol. In a paper, B. Maham and A. HjÁungnes, "Distributed GABBA space-time codes in amplify-and-forward cooperation," in Proc. ITW 2007, July 2007, there has been suggested the design of the DSTCs performed by using generalized QOSTBCs. Here, any relay nodes can be used to increase the diversity order. Moreover, a suboptimal linear decoder can be used to acquire a maximum diversity order and reduce the complexity. In a paper, Y. Jing and B. Hassibi, "Cooperative diversity in wireless relay networks with multiple antenna nodes," in Proc. ISIT'05, pp. 815~819, September 2005, the DSTCs for the AF protocol have expanded to the cooperative network by a multiple antenna. In a paper, G. S. Rajan and B. S. Rajan, "A non-orthogonal distributed space-time coded protocol—Part 1: Signal model and design criteria," in Proc. ITW'06, pp. 385~389, March 2006, there has been suggested a non-orthogonal AF (NAF) protocol generalized by using a single antenna in the source node, the relay node, and object node, respectively. They prove that 3 other protocols have the same diversity order R+1. Here, a first protocol and a second protocol are identical to the NAF protocol and the orthogonal AF (OAF) protocol, respectively. The reason that they have the same diversity order is that signals including same information transmitted from the source node undergo same fading at the first and second phases.

In such aforementioned protocols, the source node signals to the relay nodes and the destination node at the phases. At the first phase, the source node transmits a STC and the relay node transmits a re-encoded STC by using a signal decoded from the received signal. However, even through the source node transmits the signal two times at the first and second phases. Since a source-destination (SD) channel is the same at the first and second phases, the DSTCs may not increase the diversity order.

SUMMARY OF THE INVENTION

In view of the above, the present invention provides a source antenna switching scheme for a non-orthogonal protocol, which has greater diversity than a conventional non-orthogonal protocol.

In accordance with an aspect of the present invention, there is provided a source antenna switching scheme for a non-orthogonal protocol that transmits a signal of a source node through at least one RF chain having two transmitting antennas, including: selecting any one of the two antennas of each of the RF chain(s) and allowing a source node to transmit a signal to a relay node and a destination node by using the selected one antenna in a total of $M_S$ quantities; and selecting the other of the two antennas and allowing the other antenna in the $M_S$ quantities to cooperate with an antenna(s) of the relay node to transmit a signal to destination node. The $M_S$ may be the number of RF chains of the source node. The selecting of the other antenna and allowing the other antenna in the $M_S$ quantities to cooperate with an antenna(s) of the relay node may include allowing the source node and the relay node to generate a DSTC and transmit the generated DSTC to the destination node. The selecting of the other antenna and allowing the other antenna in the $M_S$ quantities to cooperate with an antenna(s) of the relay node may include: decoding or amplifying the received signal by the relay node; and generating a STC by using the decoded or amplified signal to be transmitted by the source node by use of the other antenna in the $M_S$ quantities and transmitting the generated STC to the destination node. The selecting of the other antenna and allowing the other antenna in the $M_S$ quantities to cooperate with an antenna(s) of the relay node may include: decoding the received signal by the relay node; generating a STC by using the decoded signal to be transmitted by the source node by use of the other antenna in the $M_S$ quantities and transmitting the generated STC to the destination node; and decoding by using a near ML decoding method a signal that is received through the selecting of any one of the two antennas of each of the RF chain(s) and allowing a source node to transmit a signal to a relay node and a destination node by using the selected one antenna in a total of $M_S$ quantities and the selecting of the other of the two antennas and allowing the other antenna in the $M_S$ quantities to cooperate with an antenna(s) of the relay node to transmit a signal to destination node. The near ML decoding method may be performed by a following formula:

$$\hat{x} = \arg\min_{x \in A^L} \left\{ \left\| Y_{D_1} - \sqrt{\frac{p_1}{M_S}} GX_1(x) \right\|^2 + \min_{\hat{x}_R \in A^L} \left\| Y_{D_2} - \sqrt{\frac{p_2}{M_S}} HX_2(x) - \sqrt{\frac{p_3}{M_R}} FX_3(\hat{x}_R) \right\|^2 - \sigma^2 \ln P_{SR}(x \to \hat{x}_R) \right\},$$

in which the G is a channel coefficient matrix of a channel between the source node and the destination node in the selecting of any one of the two antennas of the RF chain(s) and allowing the source node to transmit a signal to the relay node and the destination node by using the selected one antenna in the $M_S$ quantities, the H is a channel coefficient matrix of a channel between the source node and the destination node in the selecting of the other antenna and allowing the other antenna in the $M_S$ quantities to cooperate with an antenna(s) of the relay node; the F is a channel coefficient matrix of a channel between the relay node and the destination node in the selecting of the other antenna and allowing the other antenna in the $M_S$ quantities to cooperate with an antenna(s) of the relay node, the x is L data symbols transmitted from the source node through the selecting of any one of the two antennas of the RF chain(s) and allowing the source node to transmit a signal to the relay node and the destination node by using the selected one antenna in the quantities and the selecting of the other antenna and allowing the other antenna in the $M_S$ quantities to cooperate with an antenna(s) of the relay node, the $M_R$ is the number of transmitting and receiving antennas of the relay node, the $X_1(x)$ is a code of $M_S \times T_1$ of the L data symbols, the $X_2(x)$ is a code of $M_S \times T_2$ of the L data symbols, the $X_3(\hat{x}_R)$ is a code of $M_R \times T_2$ of the L data symbols, the $p_1$ is a power of a signal transmitted from the source node in a first operation, the $p_2$ is a power supplied from the source node in a second operation, the $p_3$ is a power supplied from the relay node in the second operation, the $\sigma^2$ is a power of noise in the relay node and the destination node, the $P_{SR}$ is a pairwise error probability, the S is the source node, the R is the relay node, and the D is the destination node. The two antennas of each of the RF chain(s) may operate independently from each other.

In accordance with another aspect of the present invention, there is provided a decoding method of a decode-and-forward protocol that cooperates with a relay node to transmit a signal of a source node to a destination node through at least one RF chain having two transmitting antennas, including: calculating a metric value for symbol sets $\hat{x}_R \in A^L$ that are decodable by the relay node to acquire a smallest value; squaring a distance between a signal received by the destination node and a symbol set transmittable by the source node; adding the smallest value acquired by calculating a metric value for symbol sets $\hat{x}_R \in A^L$ decodable by the relay node and the squared distance between a signal received by the destination node and a symbol set transmittable by the source node to acquire and detect a symbol set $\hat{x}$ having a minimum value.

In this case, the calculating of a metric value for symbol sets $\hat{x}_R \in A^L$ decodable by the relay node to acquire a smallest value may include: acquiring a pairwise error probability that an error of a symbol set $\hat{x}_R$ is generated in the relay node when the source node transmits a symbol set x if a signal is transmitted from the source node to the relay node and the destination node by selecting any one of the two antennas of each of the RF chain(s) and using the selected one antenna in a total of $M_S$ quantities; acquiring a natural log of the pairwise error probability and multiplying the acquired natural log by a noise power $\sigma^2$ of the relay node; squaring a distance between the signal received by the destination node and symbol sets x and $\hat{x}_R$ transmittable by the source node and the relay node when a signal is transmitted to the destination node by allowing the other antenna in the $M_S$ quantities to cooperate with an antenna(s) of the relay node to transmit a signal to the destination node; and subtracting a value acquired in the acquiring of a natural log of the pairwise error probability and multiplying the acquired natural log by a noise power $\sigma^2$ of the relay node from a value acquired in the squaring of a distance between the signal received by the destination node and symbol sets x and $\hat{x}_R$ transmittable by the source node and the relay node when a signal is transmitted to the destination node by allowing the other antenna in the $M_S$ quantities to cooperate with an antenna(s) of the relay node to transmit a signal to the destination node, and the $M_S$ are the number of RF chains of the source node The calculating of a metric value for symbol sets $\hat{x}_R \in A^L$ decodable by the relay node to acquire a smallest value may include: acquiring a pairwise error probability that an error of a symbol set $\hat{x}_R$ is generated in the relay node when the source node transmits a symbol set x if a signal is transmitted from the source node to the relay node and the destination node; acquiring a natural log of the pairwise error probability and multiplying the acquired natural log by a noise power $\sigma^2$ of the relay node; squaring a distance between the signal received by the destination node and symbol sets $\hat{x}_R$ transmittable by the source node and the relay node when a signal is transmitted to the destination node by using an antenna(s) of the relay node after the source node transmits a signal to the relay node and the destination node; and subtracting a value acquired in the acquiring of a natural log of the pairwise error probability and multiplying the acquired natural log by a noise power $\sigma^2$ of the relay node from a value acquired in the squaring of a distance between the signal received by the destination node and symbol sets $\hat{x}_R$ transmittable by the source node and the relay node when a signal is transmitted to the destination node by using an antenna(s) of the relay node after the source node transmits a signal to the relay node and the destination node, and the $M_S$ are the number of RF chains of the source node.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENT

Figure 1:
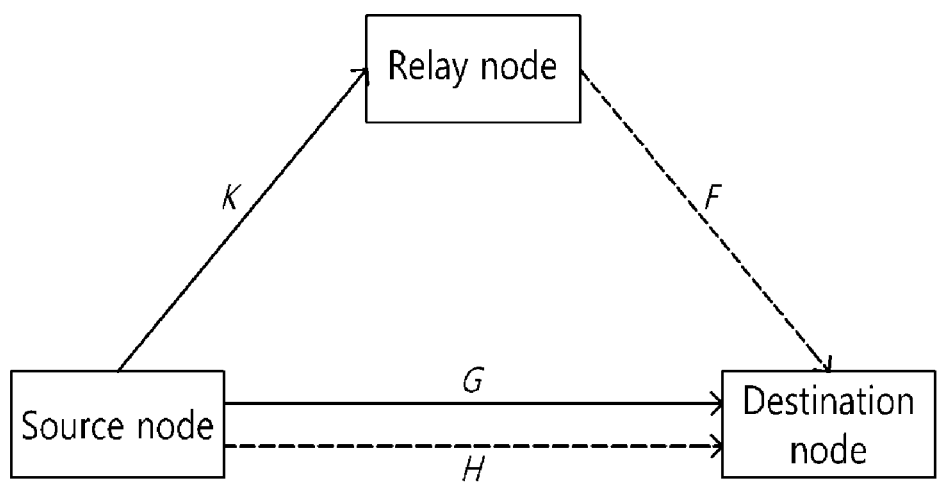
FIG. 1 is a conceptual diagram showing a non-orthogonal protocol in accordance with an embodiment of the present invention.

Some embodiments of the present invention will be now described in detail with reference to the accompanying drawings which form a part hereof.

However, the present invention is not limited to the embodiments and will be embodied as various different forms. These embodiments serve only for making completed the disclosure of the present invention and for completely informing any person of ordinary skill in the art of the scope of the present invention. Throughout the drawings, similar elements are given similar reference numerals. In the following mathematical equations, capital letters indicate matrices. $I_n$ indicates an n×n unit matrix and $\|\cdot\|$ indicates a Frobenius norm defined as the square root of the sum of the absolute squares of its elements. $\square[\square]$ indicates an expected value. $\square\square^{\square}$ and $\square\square^{\dagger}$ indicate a complex conjugate matrix and a complex conjugate transpose matrix, respectively. $C\square\square\times\square\square$ indicates a n×m complex matrix. For $A \in C^{(n \times m)}$, $A \sim CN(0, \sigma^2 I_{nm})$ indicates that the elements of A are circularly symmetric Gaussian random variables of independently identical distribution (i.i.d.) having mean of 0 and variance of $\sigma^2$ Moreover, a non-orthogonal decode-and-forward protocol in accordance with the embodiment of the present invention is called a NDF-SAS. Of course, the non-orthogonal decode-and-forward protocol is used as an example in this embodiment, but the present invention is not limited to this embodiment. The present invention is applicable to all non-orthogonal protocols performing amplitude as well as decoding.

Figure 2:
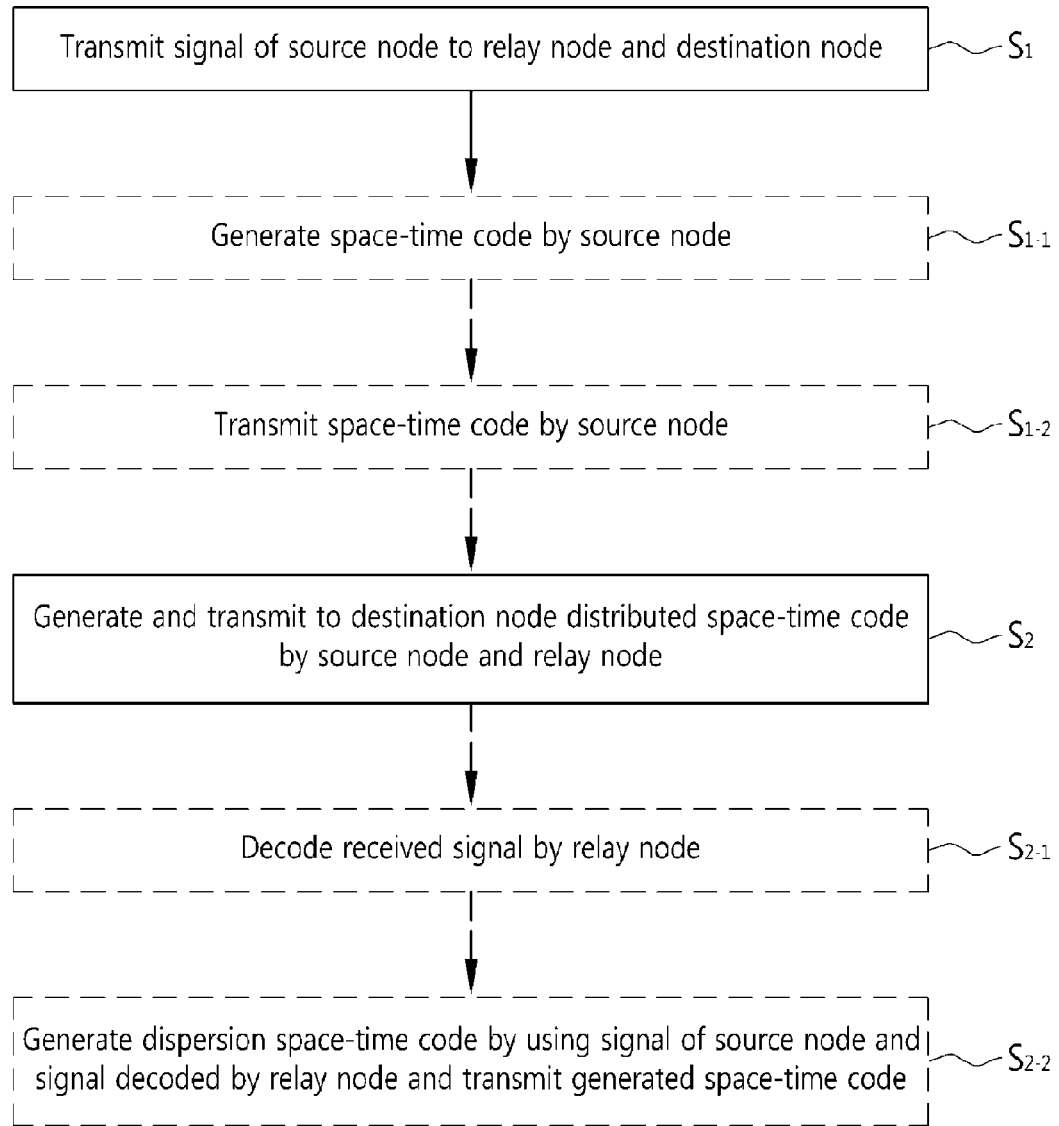
FIG. 2 is a flowchart showing a source antenna switching scheme of a non-orthogonal decode-and-forward protocol in accordance with the embodiment of the present invention.
Figure 3:
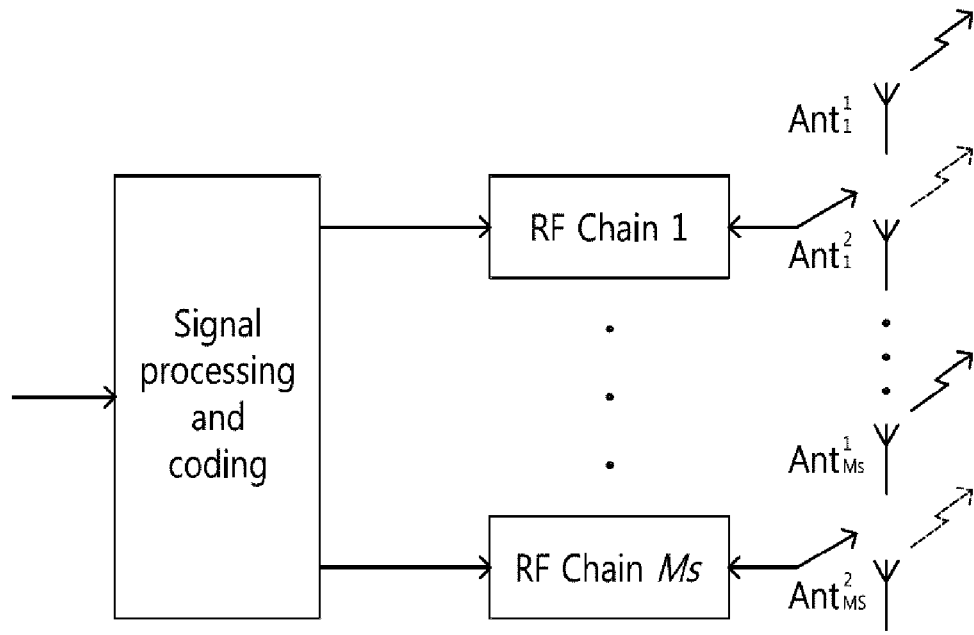
FIG. 3 is a conceptual diagram showing source antenna switching transmission of a non-orthogonal protocol in accordance with the embodiment of the present invention.
Figure 4:
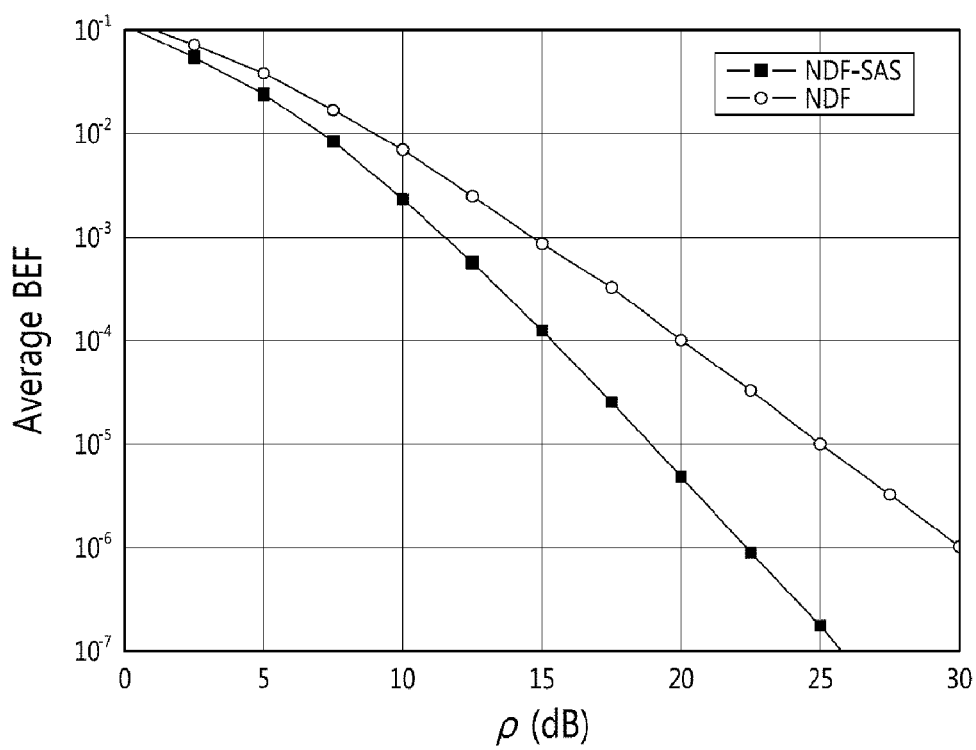
FIG. 4 is a graph comparing performances of Alamouti scheme of a NDF-SAS and a NDF protocol for $M_S=M_R=M_D=1$, when $\sigma^2_{SD}=\sigma^2_{RD}=1$, in an error-free SR channel.
Figure 5:
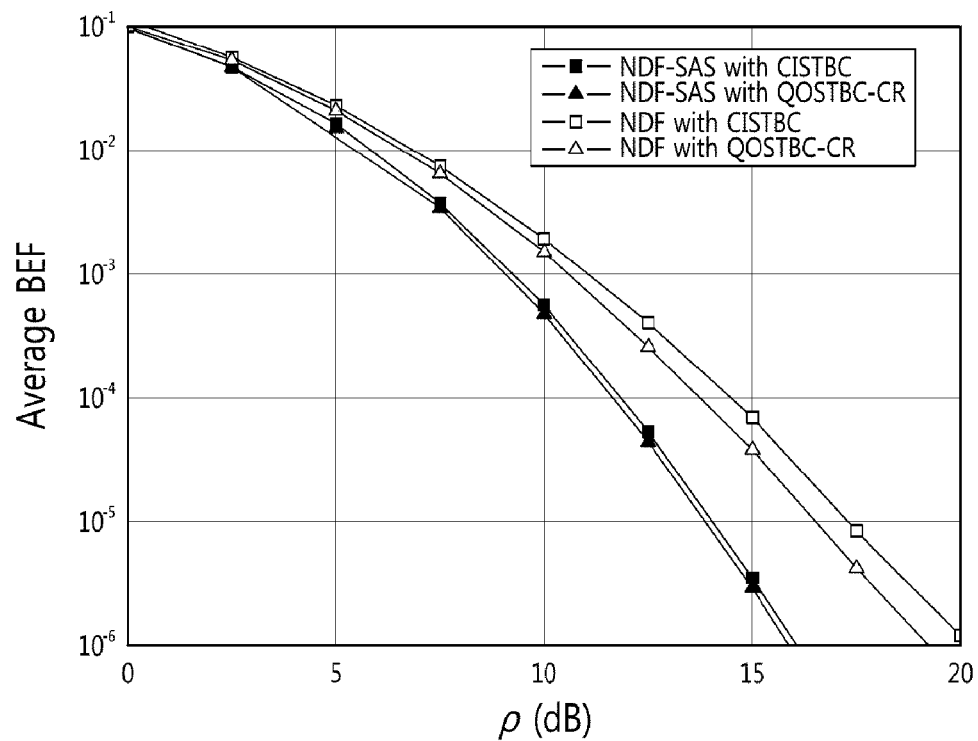
FIG. 5 is a graph comparing performances of a NDF-SAS and a NDF protocol for $M_S=M_R=2$ and $M_D=1$, when $\sigma^2_{SD}=\sigma^2_{RD}=1$, in an error-free SR channel.
Figure 6:
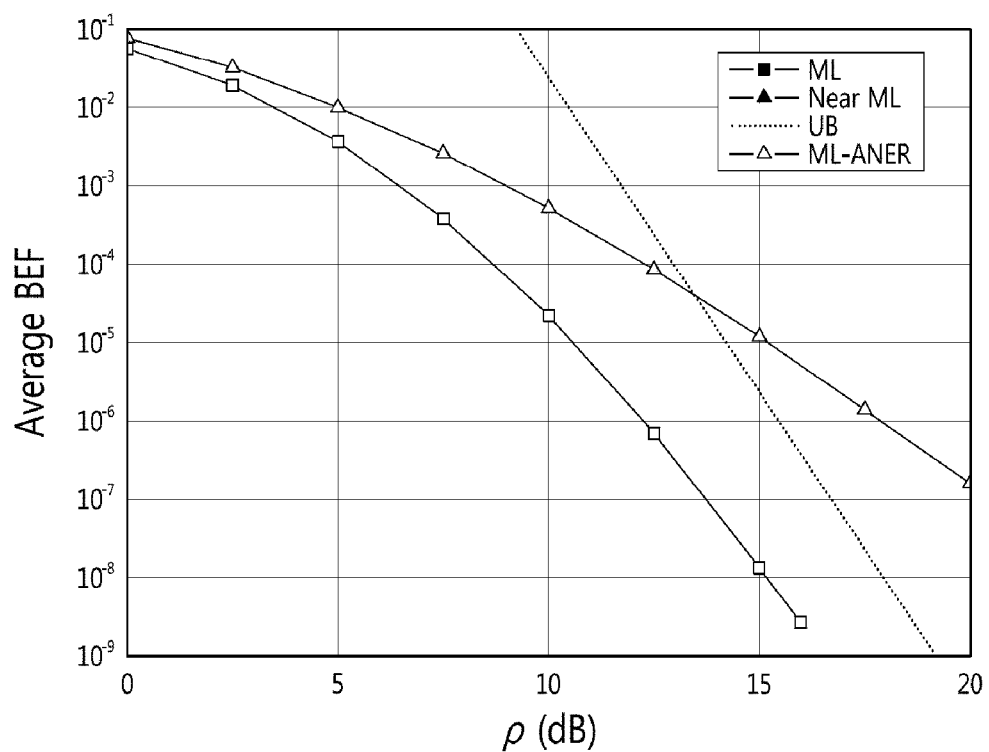
FIG. 6 is a graph comparing performances of an ML decoding method and a near ML decoding method of an ODF protocol using an Alamouti scheme and a QPSK for $M_S=M_R=M_D=2$, when $\sigma^2_{SD}=\sigma^2_{SR}=\sigma^2_{RD}=1$, in an erroneous SR channel.
Figure 7:
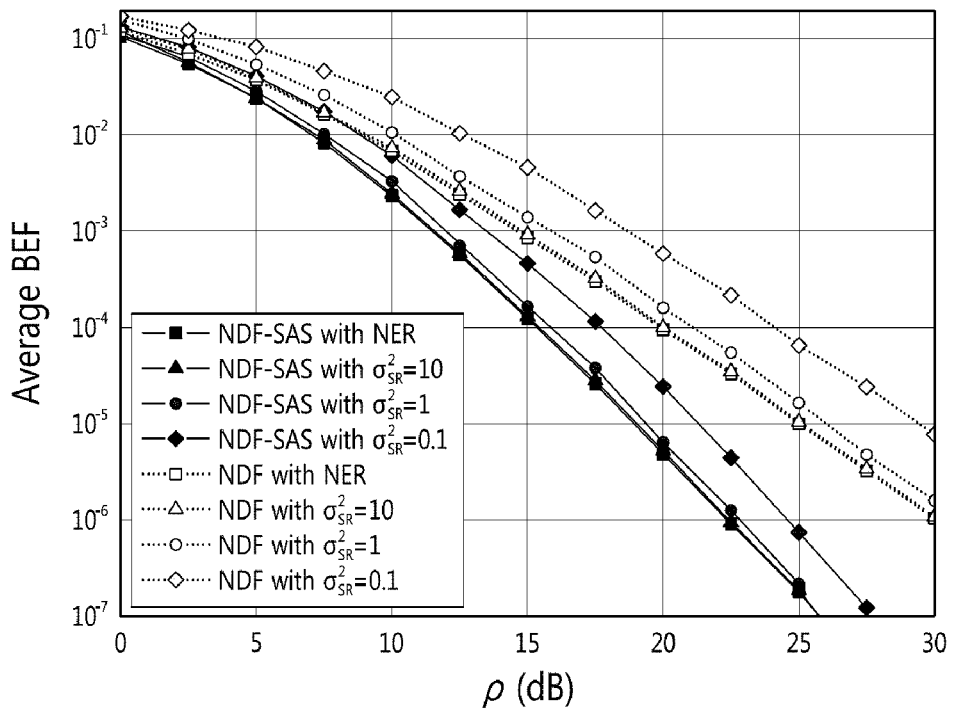
FIG. 7 is a graph comparing performances of Alamouti scheme of a NDF-SAS and a NDF protocol for $M_S=M_R=M_D=1$, when $\sigma^2_{SD}=\sigma^2_{RD}=1$, in an erroneous SR channel.
Figure 8:
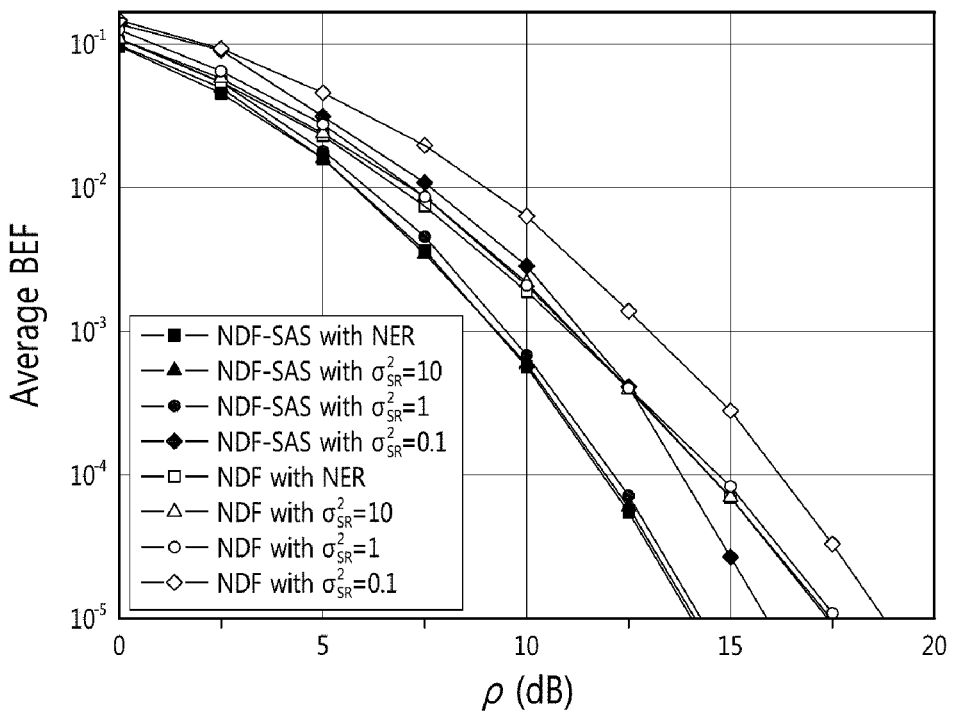
FIG. 8 is a graph comparing performances of a CISTBC scheme of a NDF-SAS and a NDF protocol for $M_S=M_R=2$ and $M_D=1$, when $\sigma^2_{SD}=\sigma^2_{RD}=1$, in an erroneous SR channel.

FIG. 1 is a conceptual diagram showing a non-orthogonal protocol in accordance with an embodiment of the present invention and FIG. 2 is a flowchart showing a source antenna switching scheme of a non-orthogonal decode-and-forward protocol in accordance with the embodiment of the present invention. FIG. 3 is a conceptual diagram showing source antenna switching transmission of a non-orthogonal protocol in accordance with the embodiment of the present invention and FIG. 4 is a graph comparing performances of Alamouti scheme of the NDF-SAS and the NDF protocols for $M_S=M_R=M_D=1$, when $\sigma^2_{SD}=\sigma^2_{RD}=1$, in an error-free SR channel. FIG. 5 is a graph comparing performances of the NDF-SAS and the NDF protocols for $M_S=M_R=2$ and $M_D=1$, when $\sigma^2_{SD}=\sigma^2_{RD}=1$, in an error-free SR channel. FIG. 6 is a graph comparing performances of an ML decoding method and a near ML decoding method of an ODF protocol using an Alamouti scheme and a QPSK for $M_S=M_R=M_D=2$, when $\sigma^2_{SD}=\sigma^2_{SR}=\sigma^2_{RD}=1$. Finally, FIG. 7 is a graph comparing performances of Alamouti scheme of a NDF-SAS and a NDF protocol for $M_S=M_R=M_D=1$, when $\sigma^2_{SD}=\sigma^2_{RD}=1$, in an erroneous SR channel and FIG. 8 is a graph comparing performances of a CISTBC scheme of the NDF-SAS and the NDF protocols for $M_S=M_R=2$ and $M_D=1$, when $\sigma^2_{SD}=\sigma^2_{RD}=1$, in an erroneous SR channel.

As shown in FIG. 1, a source antenna switching scheme of a non-orthogonal decode-and-forward protocol in accordance with the embodiment of the present invention includes transmitting a signal of a source node to a relay node and a destination node in operation $S_1$ and generating a distributed STC and transmitting the distributed STC to the destination mode by the source node and the relay node in operation $S_2$. In this case, the present embodiment assumes half duplex transmission and a channel is frequency-flat slow fading. It is also assumed that a channel coefficient is not changed from a first stage to a second stage and the destination node is notified of channel state information (CSI) of a source-relay node channel, a source-destination node channel and a relay-destination node channel.

In the operation $S_1$, a signal of a source node is simultaneously transmitted to a relay node and a destination node. The operation $S_1$ includes generating a space-time code in operation $S_{1-1}$ and transmitting the space-time code in operation $S_{1-2}$.

In the operation $S_{1-1}$, $X_1(x)$ of $M_S \times T_1$ from L data symbols $X=(x_1, x_2 \ldots x_L)$ transmitted in the operation $S_1$.

In this case, a signal matrix received from the relay node and the destination node can be represented by the following Formula 1 and Formula 2, respectively.

$$Y_R = \sqrt{\frac{\rho_1}{M_S}} KX_1(x) + N_R \qquad \text{[Formula 1]}$$

$$Y_{D_1} = \sqrt{\frac{\rho_1}{M_S}} GX_1(x) + N_{D_1} \qquad \text{[Formula 2]}$$

Here, $K \in C^{M_R \times M_S}$ and $G \in C^{M_D \times M_S}$ are channel coefficients between the source node and the relay node (SR) and the source node and the destination node (SD) dispersed as $CN(0, \sigma^2_{SR} I_{M_R M_S})$ and $CN(0, \sigma^2_{SD} I_{M_D M_S})$, respectively, in the operation $S_1$. $M_D$ is the number of receiving antennas in the destination node. $M_R \in C^{M_R \times T_1}$ and $N_{D_1} \in C^{M_D \times T_1}$ are noise matrices distributed as $CN(0, \sigma^2 I_{M_R T_1})$ and $CN(0, \sigma^2 I_{M_D T_1})$ in the relay node and the destination node, respectively.

$$\rho = \frac{1}{\sigma^2}$$

is a parameter that is linearly in proportion to an average transmission signal to noise ratio (SNR), $\rho_1$ a power of a code sent from the source node in the operation $S_1$.

In the operation $S_{1-2}$, the code $X_1(x)$ of $M_S \times T_1$ generated in the operation is transmitted to the relay node and the destination node.

In the operation $S_2$, a signal that is identical to the signal, i.e., the signal of the source node transmitted in the operation $S_1$ is re-transmitted from the source node and the relay node to the destination node. The re-transmitting of the signal of the source node and the signal of the relay node to the destination node includes decoding the received signal by the relay node in operation $S_{2-1}$ and generating a distributed space-time code with the signal of the source node signal and the signal decoded by the relay node and transmitting the distributed space-time code in operation $S_{2\text{-}2}$.

In the operation $S_{2\text{-}1}$, the space-time code transmitted from the source node is decoded to generate the space-time code. In this case, as described above, the space-time code can be generated by combining the codes transmitted from the source node and the relay node, respectively. Such the space-time code (STC) can be represented as the Formula 1.

In the operation $S_{2\text{-}2}$, the distributed space-time code is generated by using the space-time code generated by combining the codes transmitted from the source node and the relay node and the space-time code of the source node and is transmitted to the destination node.

In this case, when $X_2 \in \mathbb{C}^{M_S \times T_1}$ and $X_3 \in \mathbb{C}^{M_R \times T_2}$ are code matrices, transmitted from the relay node and the source node, having transmission powers $\rho_{2/M_S}$ and $\rho_{3/M_R}$ for each active antenna, $M_R$ is the number of receiving and transmitting antennas in the relay node. Here, in the re-transmitting of the signal of the source node and the signal of the relay node to the destination node, the distributed space-time code (DSTC) can be represented as the following formula 3 by combining the codes transmitted from the source node and the relay node.

$$\begin{bmatrix} \sqrt{\frac{p_2}{M_S}} X_2(x) \\ \sqrt{\frac{p_3}{M_R}} X_3(x_R) \end{bmatrix} \quad \text{[Formula 3]}$$

Moreover, the signal received in the destination node can be represented as the following formula 4.

$$Y_{D_2} = \sqrt{\frac{p_2}{M_S}} H X_2(x) + \sqrt{\frac{p_3}{M_R}} F X_3(x_R) + N_{D_2} \quad \text{[Formula 4]}$$

Here, $H \in \mathbb{C}^{M_D \times M_S}$ and $F \in \mathbb{C}^{M_D \times M_R}$ are channel coefficient matrices of channels between the source node and the destination node (SD) and the relay node and the destination node (RD), respectively, in a second stage. The elements of H and P are independently identical distributed (i.i.d.) circularly symmetric complex Gaussian random variables with $CN(0, \sigma^2 I_{SD})$ and $CN(0, \sigma^2 I_{RD})$, respectively. $N_{D_2} \in \mathbb{C}^{M_D \times T_2}$ is a noise matrix in the re-transmitting of the signal of the source node and the signal of the relay node to the destination node and the element of the noise matrix is an i. i. d. circularly symmetric complex Gaussian random variables with $CN(0, \sigma^2)$.

Next, an average bit error probability of a conventional NDF protocol is compared with the source antenna switching scheme of the non-orthogonal decode-and-forward protocol in accordance with the embodiment of the present invention.

Firstly, an error-free channel, i.e., a channel of $X_R = X$ will be described to observe the performance of the NDF protocol for a conventional error-free channel. In this case, the equivalent input-output relation can be simplified as the following formula 5.

$$Y_D = H_e X_e(x) + N_D \quad \text{[Formula 5]}$$

Here, $Y_D = [Y_{D1}\ Y_{D2}]$ is a matrix of the receiving signal and $H_e$ is an equivalent channel matrix represented as $H_e = [G\ H\ F]$.

$$X_e(x) = \begin{bmatrix} \sqrt{\frac{p_1}{M_S}} X_1(x) & 0 \\ 0 & \sqrt{\frac{p_2}{M_S}} X_2(x) \\ 0 & \sqrt{\frac{p_3}{M_R}} X_3(x) \end{bmatrix}$$

is an equivalent code matrix and $N = [N_{D1}\ N_{D2}]$ is a complex Gaussian noise matrix having $CN(0, \sigma^2 I_{M_D(T_1+T_2)})$.

There may be induced an average pairwise error probability for a case of confusing x with x̌ for the equivalent input and output relationship of the formula 5. A maximum likelihood (ML) decoding matrix can be defined as $m(Y_D, X_e(x)) = \|Y_D - H_e X_e(x)\|^2$. When a channel is known, the pairwise error probability can be represented as the following formula 6.

$$P(x \to \check{x}) = P(m(Y_D, X_e(\check{x})) < m(Y_D, X_e(x))) \quad \text{[Formula 6]}$$

Here, $m(Y_D, X_e(x)) = \|N_D\|^2$
and $$m(Y_D, \check{X}_e) = \|\sqrt{\rho} H_e(X_e - \check{X}_e) + N_D\|^2 = \rho\|H_e(X_e - \check{X}_e)\|^2 + 2\sqrt{\rho} Re\{tr(H_e(X_e - \check{X}_e) N_D^\dagger)\} + \|N_D\|^2$$

and $Re(\bullet)$ and $tr(\bullet)$ is a real part of a complex number and a trace of a matrix, respectively. Accordingly, a pairwise error probability can be represented as the following formula 7.

$$P(x \to \check{x}) = P(2Re\{tr(H_e(X_e(x) - X_e(\check{x})) N_D^\dagger)\} < -\|H_e(X_e(x) - X_e(\check{x}))\|^2) \quad \text{[Formula 7]}$$

Here, $2Re\{tr(H_e(X_e(x) - X_e(\check{x})) N_D^\dagger)\}$ is a real number Gaussian random variable having a mean of 0 and a variance of $2\sigma^2 \|H_e(X_e(x) - X_e(\check{x}))\|^2$. Accordingly, the pairwise error probability can be represented as the following formula 8.

$$Q\left(\sqrt{\frac{1}{2\sigma^2} \|H_e(X_e(x) - X_e(\check{x}))\|^2}\right) \quad \text{[Formula 8]}$$

Here, the average pairwise error probability can be represented as the following formula 9 by using $$Q(x) = \frac{1}{\sqrt{2\pi}} \int_x^\infty e^{-\frac{\mu^2}{2}} dy$$

as a result of Craig in $$Q(x) = \frac{1}{\pi} \int_x^{\frac{\pi}{2}} \exp\left[-\frac{x^2}{2\sin^2\theta}\right] d\theta.$$

[Formula 9]

$$E[P(x \to \bar{x})] = E[P(x \to \bar{x})]$$
$$= \frac{1}{\pi} \int_0^{\frac{\pi}{2}} E\left[\exp\left\{-\frac{\|H_e(X_e(x) - X_e(\bar{x}))\|^2}{4\sigma^2 \sin^2\theta}\right\}\right] d\theta$$
$$= \frac{1}{\pi} \int_0^{\frac{\pi}{2}} \left(E\left[\exp\left\{-\frac{\|[H_e]_4(X_e(x) - X_e(\bar{x}))\|^2}{4\sigma^2 \sin^2\theta}\right\}\right]\right)^{M_D} d\theta$$
$$= \frac{1}{\pi} \int_0^{\frac{\pi}{2}} \left(M_r\left(-\frac{1}{4\sigma^2 \sin^2\theta}\right)\right)^{M_D} d\theta$$

Here, $[H_e]_i$ is an $i^{th}$-order row of $H_e$ and $\Gamma=\|[H_e]_i(X_e(x)-X_e(\check{x}))\|^2$ and $M_\Gamma(s)=E[\exp(a\Gamma)]$. Since the rows of $H_e$ has the same statistic characteristics, the equality is maintained. The average pairwise error probability of the following formula 10 can be obtained by manipulating a moment generating function $M_\Gamma(-1/4\sigma^2 \sin^2\theta)$ by using of the following formula 20.

$$E[P(x \to \bar{x})] = \frac{1}{\pi}\int_0^{\frac{\pi}{2}} \left| I + \frac{1}{4\sigma^2\sin^2\theta} E\big[[H_e]_4^\dagger [H_e]_4\big](X_e(x) - X_e(\bar{x}))(X_e(x) - X_e(\bar{x}))^\dagger \right|^{-M_D} d\theta. \quad \text{[Formula 10]}$$

Here, for the high signal to noise ratio (SNR), if a difference matrix $X_e(x)-X_e(\check{x})$ is a full rank, the rank of $E[[H_e]_i^\dagger [H_e]_i]$ determines a diversity of the average pairwise error probability. Accordingly, by using the source antenna switching scheme of the non-orthogonal decode-and-forward protocol (hereinafter, referred to as "NDF-ASA protocol") in accordance with the embodiment of the present invention, it is possible to increase the diversity by $M_S M_D$ as compared with the conventional NDF protocol.

Next, a plurality of schemes of the NDF-SAS protocol when $M_S=M_R=M_D=1$, $M_S=M_R=2$, and $M_D=1$ will be described in accordance with the embodiment of the present invention.

An Alamouti code acquires a maximum speed and a maximum diversity for two transmitting antennas. A QOSTBC and a CISTBC having constellation rotation (QOSTBC-CR) acquire a maximum speed and a maximum diversity for four transmitting antennas. Accordingly, a plurality of code designs for the NDF-SAS protocol will be described below by using the alamouti code, the CISTBC, and the QOSTBC-CR.

When it is assumed that $$A(x_1, x_2) = \begin{bmatrix} x_1 & -x_2^* \\ x_2 & x_1^* \end{bmatrix},$$

for $M_S=M_R=M_D=1$, a formula $X_1(x)=[x_1,x_2]$ is used in an operation of transmitting the signal of the source node to the relay node and the destination node (hereinafter, referred to as "a first operation"), and Alamouti schemes $X_2(x)=[x_1,-x^*_2]$ and $X_3(x)=[x_2,x^*_1]$ are used in an operation of re-transmitting the signal of the source node and the signal of the relay node to the destination node (hereinafter, referred to as "a second operation").

In the first operation, a formula $X_1(x)=[A(x_1,x_2) A(x_3 x_4)]$ is used for $M_S=M_R=2$ and $M_D=1$. In the second operation, CISTBC schemes $X_2(x)=[A(\tilde{s}_1,\tilde{s}_2)\ 0]$ and $X_3(x)=[0\ A(\tilde{s}_3,\tilde{s}_4)]$ QOSTBC-CR schemes $X_2(x)=[A(x_1,x_2)\ A(s_3,s_4)]$ and $X_3(x)=[A(s_3,s_4)]$ are used. Here, $s_i=x_i e^{j\theta}$ and $\theta$ is a rotation angle. $\tilde{s}_i=s_{i,R}+js_{((i+1)\mod 4)+1,I}$; $i=1,2,3,4$ and $s_{i,R}$ and $s_{i,I}$ are a real part and a complex part, respectively, of $s_i$.

In accordance with the embodiment of the present invention, it is assumed that $\rho_1+\rho_2+\rho_3=2$ in the alamouti scheme. Accordingly, $\rho$ is an average transmission signal to noise ratio (SNR). $(X_e(x)-X_e(\check{x}))(X_e(x)-X_e(\check{x}))^\dagger=(|x_1-\check{x}_1|^2+|x_2-\check{x}_2|^2)$ diag($\rho_1\rho_2\rho_3$). Here, diag(•) is a diagonal matrix. This code may be a decoding single symbol. Moreover, when $X_e(x_k)$ is assumed to be $X_e$ by considering $x_i=0$ for all cases of $i \neq k$, the average pairwise error probability. The pairwise error probability of the following formula 11 is acquired from the formula 10.

$$E[P(x_k \to \bar{x_k})] = \frac{1}{\pi}\int_0^{\frac{\pi}{2}} \left| I + \frac{1}{4\sigma^2\sin^2\theta} E[H_e^\dagger H_e](X_e(x_k) - X_e(\bar{x_k}))(X_e(x_k) - X_e(\bar{x_k}))^\dagger \right|^{-1} d\theta \quad \text{[Formula 11]}$$

Here, $E[H_e^\dagger H_e]=\text{diag}(\sigma^2_{SD},\sigma^2_{SD},\sigma^2_{RD})$ for the NDF-SAS protocol.

$$E[H_e^\dagger H_e] = \begin{vmatrix} \sigma^2_{SD} & \sigma^2_{SD} & 0 \\ \sigma^2_{SD} & \sigma^2_{SD} & 0 \\ 0 & 0 & \sigma^2_{RD} \end{vmatrix}$$

for the NDF protocol. Accordingly, the average pairwise error probabilities for the NDF-SAS protocol and the NDF protocol, respectively, can be acquired as the following formulae 12 and 13.

$$E[P(x_k \to \check{x_k})] = \frac{1}{\pi}\int_0^{\frac{\pi}{2}} \left(1 + \frac{p_1\sigma^2_{SD}\Delta^2_{x_k}}{4\sigma^2\sin^2\theta}\right)^{-1} \left(1 + \frac{p_2\sigma^2_{SD}\Delta^2_{x_k}}{4\sigma^2\sin^2\theta}\right)^{-1} \left(1 + \frac{p_3\sigma^2_{SD}\Delta^2_{x_k}}{4\sigma^2\sin^2\theta}\right)^{-1} d\theta \quad \text{[Formula 12]}$$

$$E[P(x_k \to \check{x_k})] = \frac{1}{\pi}\int_0^{\frac{\pi}{2}} \left(1 + \frac{(p_1+p_2)\sigma^2_{SD}\Delta^2_{x_k}}{4\sigma^2\sin^2\theta}\right)^{-1} \left(1 + \frac{p_3\sigma^2_{RD}\Delta^2_{x_k}}{4\sigma^2\sin^2\theta}\right)^{-1} d\theta \quad \text{[Formula 13]}$$

Here, $\Delta_{x_k}=|x_k-\check{x}_k|, k=1,2$. The diversity order three is acquired from the formulae 12 and 13 by the NDF-SAS protocol. This means that the NDF-SAS protocol is grater than the NDF protocol of the diversity order two.

In the embodiment of the present invention, it is assumed that $2p_1+p_2+p_3=4$ for the CISTBC. Accordingly, $\rho=1/\sigma^2$ is an average transmission signal to noise ratio (SNR). In this case, since $$(X_e(x) - X_e(\check{x}))(X_e(x) - X_e(\check{x}))^\dagger = \sum_{k=1}^{4} (X_e(x_k) - X_e(\check{x}_k))(X_e(x_k) - X_e(\check{x}_k)),$$

the average pairwise error probability can be independently induced and the formula 11 can be used to induce the average pairwise error probability. When it is assumed that $\Delta_{s_{k,R}}=|s_{k,R}-\check{s}_{k,R}|$ and $\Delta_{s_{k,I}}=|s_{k,I}-\check{s}_{k,I}|$, $(X_e(x_k)-X_e(\check{x}_k))(X_e(x_k)-X_e(\check{x}_k))^\dagger$ can be represented as the following formula 14.

[Formula 14]

$$(X_e(x_k) - X_e((\bar{x})_k))(X_e(x_k) - X_e(\check{x}_k)) = $$
$$\begin{cases} \frac{1}{2}\text{diag}(p_1\Delta^2_{x_k}, p_1\Delta^2_{x_k}, p_2\Delta^2_{x_{k,R}}, p_2\Delta^2_{x_{k,R}}, p_3\Delta^2_{x_{k,I}}, p_3\Delta^2_{x_{k,I}}), & \text{for } k = 1, 2 \\ \frac{1}{2}\text{diag}(p_1\Delta^2_{x_k}, p_1\Delta^2_{x_k}, p_2\Delta^2_{x_{k,I}}, p_2\Delta^2_{x_{k,I}}, p_3\Delta^2_{x_{k,R}}, p_3\Delta^2_{x_{k,R}}), & \text{for } k = 3, 4 \end{cases}$$

Moreover, the following formula 15 is for the NDF-SAS protocol and the following formula 16 is for the NDF protocol.

$$B[H_e^\dagger H_e] = diag(\sigma_{SD}^2, \sigma_{SD}^2, \sigma_{SD}^2, \sigma_{SD}^2, \sigma_{RD}^2, \sigma_{RD}^2) \quad \text{[Formula 15]}$$

$$B[H_e^\dagger H_e] = \begin{vmatrix} \sigma_{SD}^2 I_2 & \sigma_{SD}^2 I_2 & 0 \\ \sigma_{SD}^2 I_2 & \sigma_{SD}^2 I_2 & 0 \\ 0 & 0 & \sigma_{RD}^2 I_2 \end{vmatrix} \quad \text{[Formula 16]}$$

If the formulae 15 and 16 are put to the formula 11, the average pairwise error probability for the NDF-SAS protocol can be represented as the following formula 17.

[Formula 17]

$$E|P(x_k \to \check{x}_k)| =$$

$$\begin{cases} \frac{1}{\pi} \int_0^{\frac{\pi}{2}} \left(1 + \frac{p_1 \sigma_{SD}^2 \Delta_{x_k}^2}{8\sigma^2 \sin^2\theta}\right)^{-2} \left(1 + \frac{p_2 \sigma_{SD}^2 \Delta_{x_k,R}^2}{8\sigma^2 \sin^2\theta}\right)^{-2} \left(1 + \frac{p_3 \sigma_{RD}^2 \Delta_{x_k,I}^2}{8\sigma^2 \sin^2\theta}\right)^{-2} d\theta, \\ \quad \text{for } k = 1, 2 \\ \frac{1}{\pi} \int_0^{\frac{\pi}{2}} \left(1 + \frac{p_1 \sigma_{SD}^2 \Delta_{x_k}^2}{8\sigma^2 \sin^2\theta}\right)^{-2} \left(1 + \frac{p_2 \sigma_{SD}^2 \Delta_{x_k,I}^2}{8\sigma^2 \sin^2\theta}\right)^{-2} \left(1 + \frac{p_3 \sigma_{RD}^2 \Delta_{x_k,R}^2}{8\sigma^2 \sin^2\theta}\right)^{-2} d\theta, \\ \quad \text{for } k = 3, 4 \end{cases}$$

Since $\Delta_{x_k}^2 \neq 0$, $\Delta_{s_{k,R}}^2 \neq 0$, $\Delta_{s_{k,I}}^2 \neq 0$ when $\sigma^2 \to 0$, the diversity order becomes six. Similarly, the formulae 14 and 16 are put to the formula 11, the average pairwise error probability for the NDF protocol can be represented as the following formula 18.

[Formula 18]

$$E|P(x_k \to \check{x}_k)| =$$

$$\begin{cases} \frac{1}{\pi} \int_0^{\frac{\pi}{2}} \left(1 + \frac{\sigma_{SD}^2 (p_1 \Delta_{x_k}^2 + p_2 \Delta_{x_k,R}^2)}{8\sigma^2 \sin^2\theta}\right)^{-2} \left(1 + \frac{\sigma_{RD}^2 p_3 \Delta_{x_k,I}^2}{8\sigma^2 \sin^2\theta}\right)^{-2} d\theta, \\ \quad \text{for } k = 1, 2 \\ \frac{1}{\pi} \int_0^{\frac{\pi}{2}} \left(1 + \frac{\sigma_{SD}^2 (p_1 \Delta_{x_k}^2 + p_2 \Delta_{x_k,I}^2)}{8\sigma^2 \sin^2\theta}\right)^{-2} \left(1 + \frac{\sigma_{RD}^2 p_3 \Delta_{x_k,R}^2}{8\sigma^2 \sin^2\theta}\right)^{-2} d\theta, \\ \quad \text{for } k = 3, 4. \end{cases}$$

In other words, the diversity order of the average pairwise error probability for the NDF protocol is four. If it is assumed that $\rho_1+\rho_2+\rho_3=2$ for the QOSTBC-CR scheme, $\rho$ is the signal to noise ratio (SNR).

Since $(X_e(x)-X_e(\check{x}))(X_e(x)-X_e(\check{x}))^\dagger = (X_e(x_1,x_3)-X_e(\check{x}_1,\check{x}_3))(X_e(x_1,x_3)-X_e(\check{x}_1,\check{x}_3))^\dagger + (X_e(x_2,x_4)-X_e(\check{x}_2,\check{x}_4))(X_e(x_2,x_4)-X_e(\check{x}_2,\check{x}_4))^\dagger$ (when $X_e(x_k)$ is assumed to be $X_e$ by considering $x_i=0$ for all cases of $i \neq k$), the average pairwise error probability can be induced in a pair for $(x_1,x_3)$ and $(x_2,x_4)$.

In the embodiment of the present invention, $X_e(x_1,x_3)$ is considered to induce the average pairwise error probability and $X(x)=X_e(x_1,x_3)$ and $X(\check{x})=X_e(\check{x}_1,\check{x}_3)$.

From the above average pairwise error probability, the following formula 19 can be acquired.

$$E[P(x \to \check{x})] = \frac{1}{\pi} \int_0^{\frac{\pi}{2}} \left| I + \frac{1}{4\sigma^2 \sin^2\theta} E[H_e^\dagger H_e](X(x)-X(\check{x}))(X(x)-X(\check{x}))^\dagger \right|^{-1} d\theta \quad \text{[Formula 19]}$$

Here, $$(X(x)-X(\check{x}))(X(x)-X(\check{x}))^\dagger = \frac{1}{2}\begin{bmatrix} c_1 p_1 I_2 & 0 & 0 \\ 0 & c_2 p_2 I_2 & d\sqrt{p_2 p_3} I_2 \\ 0 & d\sqrt{p_2 p_3} I_2 & c_2 p_3 I_2 \end{bmatrix},$$

$c_1 = |x_1-\hat{x}_1|^2 + |x_3-\check{x}_3|^2$, $c_2 = |x_1-\check{x}_1|^2 + |s_3-\check{s}_3|^2$ and $d = 2\text{Re}\{(x_1-\check{x}_1)(s_3-\check{s}_3)^*\}$. Since $s_k = x_k e^{j\Phi}$, $c_1 = c_2$.

Accordingly, the average pairwise error probability for the NDF-SAS protocol can be represented as the following formula 20.

$$E[P(x \to \check{x})] = \frac{1}{\pi} \int_0^{\frac{\pi}{2}} \left(1 + \frac{c_2 p_1 \sigma_{SD}^2}{8\sigma^2 \sin^2\theta}\right)^{-2} \quad \text{[Formula 20]}$$

$$\left(1 + \frac{c_2 p_2 \sigma_{SD}^2}{8\sigma^2 \sin^2\theta} + \frac{c_2 p_3 \sigma_{RD}^2}{8\sigma^2 \sin^2\theta} + \frac{p_2 p_3 \sigma_{SD}^2 \sigma_{RD}^2}{64\sigma^4 \sin^4\theta}(c_2^2 - d^2)\right)^{-2}$$

$$d\theta,$$

Here, $c_2^2 - d^2 > 0$ and the diversity order is six. The average pairwise error probability for the NDF protocol can be represented as the following formula 21.

$$E[P(x \to \check{x})] = \quad \text{[Formula 21]}$$

$$\frac{1}{\pi} \int_0^{\frac{\pi}{2}} \left(1 + \frac{c_2(p_1+p_2)\sigma_{SD}^2}{8\sigma^2 \sin^2\theta} + \frac{c_2 p_3 \sigma_{RD}^2}{8\sigma^2 \sin^2\theta} + \right.$$

$$\left. \frac{c_2^2 p_1 p_3 \sigma_{SD}^2 \sigma_{RD}^2}{64\sigma^4 \sin^4\theta} + \frac{p_2 p_3 \sigma_{SD}^2 \sigma_{RD}^2}{64\sigma^4 \sin^4\theta}(c_2^2 - d^2)\right)^{-2} d\theta.$$

For the NDF protocol, the diversity order is six.

Table 1 shows the diversity orders of the NDF-SAS and NDF protocols using various DSTCs for $M_S=M_R=M_D=1$, $M_S=M_R=2$, and $M_D=1$

TABLE 1

| | | NDF-SAS | NDF |
|---|---|---|---|
| $M_S = M_R = M_D = 1_{(Alamouti)}$ | | 3 | 2 |
| $M_S = M_R = 2, M_D = 1$ | CISTBC | 6 | 4 |
| | QOSTBC | | |

As shown in Table 1, the diversity order of the NDF-SAS in accordance with the embodiment of the present invention is higher than that of the conventional NDF. Below described is a simulation for checking the diversity orders of the Table 1.

For the simulation, the whole transmission power is the same in the first stage and second stage. The power is evenly allotted to each transmitting antenna. Accordingly, when $M_S=M_R=M_D=1$, it is assumed that $P_1=1$, $P_2=0.5$, and $P_3=0.5$ for the NDF-SAS protocol and the NDF protocol.

When $M_S=M_R=2$ and $M_D=1$, it is assumed that $P_1=1$, $P_2=1$, and $P_3=1$ for the CISTBC scheme and $P_1=1$, $$p_2 = \frac{1}{2}, \text{ and } p_3 = \frac{1}{2}$$

for the QOSTBC-CR scheme to make the whole transmitting even. For the QPSK modification, an optimized rotating angle is $-31.7175°$ for the CISTBC scheme and $-45°$ for the QOSTBC-CR scheme in accordance with the embodiment of the present invention.

To compare the average pairwise error probabilities of the NDF-SAS and NDF protocols, FIGS. 4 and 5 show simulation results of $\sigma^2_{SD}=\sigma^2_{RD}=1$ for $M_S=M_R'M_D=1$, and $M_S=M_R=2$ and $M_D=1$, respectively. It is recognized that the diversity order of the NDF-SAS is higher than that of the conventional NDF from the FIGS. 4 and 5. According to the analysis and calculating result, it is recognized that the diversity order of the NDF-SAS protocol is improved for the error-free SR channel.

Next, a performance of the NDF protocol for a conventional error SR channel will be described.

Firstly, a maximum likelihood (ML) decoding scheme of the NDF protocol for the error SR channel is defined. In this case, since it is impossible to use a maximum cooperation between the source node and the relay node, the signals transmitted from the relay node and the source node, respectively, are not accurately identical to each other. Accordingly, a maximum likelihood decoder (hereinafter, referred to as "an ML decoder") can be represented as the following formula 22.

$$\begin{aligned}\hat{x} &= \underset{x \in A^L}{\arg\max}\, p(Y_{D1}, Y_{D2} \mid x) \\ &= \underset{x \in A^L}{\arg\max} \sum_{\hat{x}_R \in A^L} p(Y_{D1}, Y_{D2} \mid x, \hat{x}_R) P_{SR}(\hat{x}_R \mid x) \\ &= \underset{x \in A^L}{\arg\max}\, p(Y_{D1} \mid X_1(x)) \sum_{\hat{x}_R \in A^L} p\frac{(Y_{D2} \mid X_2(x), X_3(\hat{x}_R))}{P_{SR}(\hat{x}_R \mid x)} \\ &= \underset{x \in A^L}{\arg\max}\left[-\frac{\left\|Y_{D1}-\sqrt{\frac{p_1}{M_S}}GX_1(x)\right\|^2}{\sigma^2} + \ln\sum_{\hat{x}_R \in A^L}\exp\left(\frac{-\left\|Y_{D2}-\sqrt{\frac{p_2}{M_S}}HX_2(x)-\sqrt{\frac{p_3}{M_R}}FX_3(\hat{x}_R)\right\|^2+\sigma^2\ln P_{SR}(\hat{x}_R \mid x)}{\sigma^2}\right)\right]\end{aligned}$$ [Formula 22]

Here, A is a signal set for a M-ary signal constellation and $P_{SR}(\hat{x}_R|x)$ is a probability that the relay node decodes a received signal for $\hat{x}_R$ when the source node transmits x in the first stage.

In the formula 22, since it is difficult to $P_{SR}(\hat{x}_R|x)$ induce for a code $x_1$, $P_{SR}(x \to \hat{x}_R)$ is used in accordance with the embodiment of the present invention, $P_{SR}(x \to \hat{x}_R)$ is a PEP determining $\hat{x}_R$ in the relay node when x is transmitted from the source node. Even if the pairwise error probability is not identical to $P_{SR}(\hat{x}_R|x)$, $P_{SR}(\hat{x}_R|x)$ can be used to acquire a solution of the formula 22. Further, an approximate value of $$\sum_i e^{x_i} \approx \max_i x_i$$

is used for a high signal to noise ratio (SNR), i.e., $\sigma^2 \to 0$. Eventually, the ML decoder approaches to the following formula 23.

$$\hat{x} = \underset{x \in A^L}{\arg\min}\left\{\left\|Y_{D1}-\sqrt{\frac{p_1}{M_S}}GX_1(x)\right\|^2 + \underset{\hat{x}_R \in A^L}{\min}\left[\left\|Y_{D2}-\sqrt{\frac{p_2}{M_S}}HX_2(x)-\sqrt{\frac{p_3}{M_R}}FX_3(\hat{x}_R)\right\|^2 - \sigma^2\ln P_{SR}(x \to \hat{x}_R)\right]\right\}$$ [Formula 23]

In this case, the decoder is called a near ML decoder. Of course, the present embodiment applies the near ML decoder to a non-orthogonal decode-and-forward protocol. The present invention is not limited to the embodiment. In accordance with the present invention, the near ML decoder can be applied to a orthogonal decode-and-forward protocol in which the source node transmits a signal to the relay node and the destination node in the first stage and only the relay node transmits a signal to the destination node in the second stage.

In other words, in accordance with the present invention, the non-orthogonal decode-and-forward protocol acquires a smallest value by calculating a matrix value for symbol sets $\hat{x}_R \in A^L$ decodable by the relay node and squares a distance between the signal received by the destination node and of the symbol sets x transmittable by the source node. Further, the non-orthogonal decode-and-forward protocol adds the smallest value acquired by calculating a matrix value for symbol sets $\hat{x}_R \in A^L$ decodable by the relay node and a value obtained by squaring the distance between the signal received by the destination node and the symbol sets x transmittable by the source node. Then, a decoding process of the destination node is completed by detecting a symbol set $\hat{x}$ having a minimum value acquired by adding the smallest value acquired by calculating a matrix value for symbol sets $\hat{x}_R \in A^L$ decodable by the relay node and a value obtained by squaring the distance between the signal received by the destination node and the symbol sets x transmittable by the source node, for all transmittable symbol sets x.

In this case, the calculation of a matrix value is performed as follows. In a first stage where the source node transmits a signal to the relay node and the destination node, when the source node transmits a symbol set x, a pairwise error probability in which the relay node generates an error of the symbol set $\hat{x}_R$. Then, in a second stage where a natural log of the pairwise error probability is acquired, a noise power $\sigma^2$ of the relay node is multiplied, and the source node and the relay node cooperate to transmit a signal to the destination node, a distance between the signal received by the destination node and symbol sets x and $\hat{x}_R$ transmittable by the source node and the relay node are squared. Finally, in the second stage, the calculation of a matrix value can be performed by subtracting a value acquired by squaring the distance between the signal received by the destination node and symbol sets x and $\hat{x}_R$ transmittable by the source node and the relay node and another value acquired by obtaining the natural log of the pairwise error probability and by multiplying the natural log by a noise power $\sigma^2$ of the relay node.

If such a near ML decoding method is applied to the orthogonal decode-and-forward protocol, the calculation of a matrix value can be performed by blocking the signal transmission of the source node in the second stage. In other words, while calculating the matrix value of the aforementioned non-orthogonal decode-and-forward protocol, only the relay node is allowed to transmit the signal to the destination node to apply the near ML decoding method to the orthogonal decode-and-forward protocol. See FIG. 6 for the orthogonal decode-and-forward protocol. As shown as the near ML decoding method has the same performance as the ML decoding method.

Next, in accordance with the embodiment of the present invention, an upper limit of the pairwise error probability is induced. Since the relay node can transmit any symbol, the average pairwise error probability can be represented as the following formula 24.

$$E[P(x \to \check{x})] = \sum_{\hat{x}_R \in A^L} E[P(x \to \check{x} | x_R) P_{SR}(x_R | x)] \quad [\text{Formula 24}]$$

Here, $P(x \to \check{x} | x_R)$ is a conditional pairwise error probability that the destination node determines $\check{x}$ when x and $x_R$ are transmitted from the source node and the relay node, respectively. It is assumed that the source node transmits a signal x n a first stage and the relay node decodes the received signal for $x_R$ to transmit the decoded signal to the destination node in a second stage. Then, the transmission pairwise error probability of the formula 24 can be represented as the following formula 25.

$$P(x \to \check{x}|x_R) = P(m([Y_{D_1}, Y_{D_2}], \check{x}|x, x_R) < m([Y_{D_1}, Y_{D_2}], x|x, x_R)) \quad [\text{Formula 25}]$$

Here, $m([Y_{D_1}, Y_{D_2}], x|x, x_R)$ and $m([Y_{D_1}, Y_{D_2}], \check{x}|x, x_R)$ are matrices of the formula 23 that determine x and $\check{x}$ for x and $x_R$ transmitted from the source node and the relay node.

$P_{SR} = (x \to \check{x}_R)$ for a SR channel can be represented as the following formula 26 by analysis of the aforementioned average pairwise error probability.

$$P_{SR}(x \to \hat{x}_R) = Q\left(\sqrt{\frac{p_1}{2\sigma^2 M_S}} \|K(X_1(x) - X_1(\hat{x}_R))\|^2 \right) \quad [\text{Formula 26}]$$

Here, $\lim_{\sigma^2 \to 0} \sigma^2 \ln P_{SR}(x \to z) = 0$ for $z = x$.

Otherwise, $$\lim_{\sigma^2 \to 0} \sigma^2 \ln P_{SR}(x \to z) = \lim_{\sigma^2 \to 0} \sigma^2 \ln Q\left(\sqrt{\frac{p_1}{2\sigma^2 M_S}} \|K(X_1(x) - X_1(\hat{x}_R))\|^2 \right)$$

$$= \lim_{\sigma^2 \to 0} \sigma^2 \ln \frac{e^{-\frac{p_1 \|K(X_1(x)-X_1(\hat{x}_R))\|^2}{4\sigma^2 M_S}}}{\sqrt{2\pi \frac{p_1}{2\sigma^2 M_S} \|K(X_1(x) - X_1(\hat{x}_R))\|^2}}$$

$$= -\frac{p_1}{4M_s} \|K(X_1(x) - X_1(\hat{x}_R))\|^2$$

Accordingly, for the high signal to noise ratio (SNR), the matrix of the formula 25 approaches to the following formulae 27 and 28.

$$m([Y_{D_1}, Y_{D_2}], x|x, x_R) \approx \quad [\text{Formula 27}]$$

$$\|N_{D_1}\|^2 + \min_{\hat{x}_R \in A^L} \left[ \left\| \sqrt{\frac{p_3}{M_R}} F(X_3(x_R) - X_3(\hat{x}_R)) + N_{D_2} \right\|^2 + \left\| \sqrt{\frac{p_1}{4M_S}} K(X_1(x) - X_1(\hat{x}_R)) \right\|^2 \right]$$

$$m([Y_{D_1}, Y_{D_2}], \bar{x}|x, x_R) \approx \quad [\text{Formula 28}]$$

$$\left\| \sqrt{\frac{p_1}{M_S}} G(X_1(x) - X_1(\bar{x})) + N_{D_1} \right\|^2 +$$

$$\min_{\hat{x}_R \in A^L} \left[ \left\| \sqrt{\frac{p_1}{M_S}} H(X_2(x) = X_2(\bar{x})) + \sqrt{\frac{p_3}{M_R}} F(X_3(x_R) - X_3(\hat{x}_R)) + N_{D_2} \right\|^2 + \left\| \sqrt{\frac{p_1}{4M_S}} K(X_1(\bar{x}) - X_1(\hat{x}_R)) \right\|^2 \right]$$

Two cases of $x_R = x$ and $x_R \neq x$ are considered to induce the average pairwise error probability in the formula 24.

Firstly, for $x_R = x$, the matrices of the formulae 27 and 28 can be represented as the following formulae 29 and 30.

$$m([Y_{D_1}, Y_{D_2}], x|x, x_R) \approx \|N_{D_1}\|^2 + \|N_{D_2}\|^2 \quad [\text{Formula 29}]$$

$$m([Y_{D_1}, Y_{D_2}], \check{x}|x, x_R) \left\| \sqrt{\frac{p_1}{M_S}} G(X_1(x) - X_1(\check{x})) + N_{D_1} \right\|^2 + \quad [\text{Formula 30}]$$

$$\left\| \sqrt{\frac{p_1}{M_S}} H(X_2(x) - X_2(\check{x})) \sqrt{\frac{p_3}{M_R}} F(X_3(x) - X_3(\hat{x}_R^{min})) + N_{D_2} \right\|^2 + \left\| \sqrt{\frac{p_1}{4M_S}} K(X_1(\check{x}) - X_1(\hat{x}_R^{min})) \right\|^2$$

Here, $$\hat{x}_R^{min} = \min_{\hat{x}_R \in A^L} \left\| \sqrt{\frac{p_1}{M_S}} H(X_2(x) - X_2(\check{x})) + \sqrt{\frac{p_3}{M_R}} F(X_3(x) - X_3(\check{x}_R)) + N_{D_2} \right\|^2 + \left\| \sqrt{\frac{p_1}{4M_S}} K(X_1(\check{x}) - X_1(\hat{x}_R)) \right\|^2.$$

Then, for $x_R = x$, an expected value of a right-hand side of the formula 24 can be represented as the following formula 31.

$$E[P(x \to \bar{x}|x)P_{SR}(x|x)] \leq \qquad \text{[Formula 31]}$$

$$E\left[Q\left(\frac{\left\|\sqrt{\frac{p_1}{M_S}}G(X_1(x)-X_1(\bar{x}))\right\|^2 + \left\|\sqrt{\frac{p_2}{M_S}}H(X_2(x)-X_2(\bar{x})) + \sqrt{\frac{p_3}{M_R}}F(X_3(x)-X_3(\hat{x}_R^{\prime min}))\right\|^2 - \left\|\sqrt{\frac{p_1}{4M_S}}K(X_1(x)-X_1(x_R))\right\|^2}{\sqrt{2\sigma^2\left[\left\|\sqrt{\frac{p_1}{M_S}}G(X_1(x)-X_1(\bar{x}))\right\|^2 + \left\|\sqrt{\frac{p_2}{M_S}}H(X_2(x)-X_2(\bar{x})) + \sqrt{\frac{p_3}{M_R}}F(X_3(x_R)-X_3(\hat{x}_R^{\prime min}))\right\|^2\right]}}\right)\right] \leq$$

$$E\left[Q\left(\sqrt{\frac{\left\|\sqrt{\frac{p_1}{M_S}}G(X_1(x)-X_1(\bar{x}))\right\|^2 + \left\|\sqrt{\frac{p_2}{M_S}}H(X_2(x)-X_2(\bar{x})) + \sqrt{\frac{p_3}{M_R}}F(X_3(x)-X_3(\hat{x}_R^{min}))\right\|^2 + \left\|\sqrt{\frac{p_1}{4M_S}}K(X_1(\bar{x})-X_1(\hat{x}_R^{min}))\right\|^2}{2\sigma^2}}\right)\right] =$$

$$E\left[e^{-\frac{\left\|\sqrt{\frac{p_1}{M_S}}G(X_1(x)-X_1(\bar{x}))\right\|^2 + \left\|\sqrt{\frac{p_2}{M_S}}H(X_2(x)-X_2(x)) + \sqrt{\frac{p_3}{M_R}}F(X_3(x)-X_3(\hat{x}_R^{min}))\right\|^2}{4\sigma^2}}\right]E\left[e^{-\frac{\left\|\sqrt{\frac{p_1}{4M_S}}K(X)(x)-X_1(\hat{x}_R^{min})\right\|^2}{4\sigma^2}}\right]$$

For $x_R \neq x$, the matrices of the formulae 27 and 28 can be represented as the following formulae 32 and 33, respectively.

$$m([Y_{D_1}, Y_{D_2}], \check{x} \mid x, x_R) \leq \qquad \text{[Formula 32]}$$

$$\|N_{D_1}\|^2 + \|N_{D_2}\|^2 + \left\|\sqrt{\frac{p_1}{4M_S}}K(X_1(x)-X_1(x_R))\right\|^2$$

-continued $$m([Y_{D_1}, Y_{D_2}], \check{x} \mid x, x_R) \geq \qquad \text{[Formula 33]}$$

$$\left\|\sqrt{\frac{p_1}{M_S}}G(X_1(x)-X_1(\bar{x})) + N_{D_1}\right\|^2 +$$

$$\left\|\sqrt{\frac{p_1}{M_S}}H(X_2(x)-X_2(\bar{x})) + \sqrt{\frac{p_3}{M_R}}F(X_3(x_R)-X_3(\hat{x}_R^{\prime min})) + N_{D_2}\right\|^2$$

Here, $$\hat{x}_R^{\prime min} = \min_{\hat{x}_R \in A^L}\left\|\sqrt{\frac{p_1}{M_S}}H(X_2(x)-X_2(\bar{x})) + \sqrt{\frac{p_3}{M_R}}F(X_3(x_R)-X_3(\hat{x}_R)) + N_{D_2}\right\|^2.$$

Then, an expected value of a right-hand side of the formula 24 can be represented as the following formula 34.

$$E[P(x \to \bar{x} \mid x_R)P_{SR}(x_R \mid x)] \leq \qquad \text{[Formula 34]}$$

$$E\left[Q\left(\frac{\left\|\sqrt{\frac{p_1}{M_S}}G(X_1(x)-X_1(\bar{x}))\right\|^2 + \left\|\sqrt{\frac{p_2}{M_S}}H(X_2(x)-X_2(\bar{x})) + \sqrt{\frac{p_3}{M_R}}F(X_3(x)-X_3(\hat{x}_R^{\prime min}))\right\|^2 - \left\|\sqrt{\frac{p_1}{4M_S}}K(X_1(x)-X_1(x_R))\right\|^2}{\sqrt{2\sigma^2\left[\left\|\sqrt{\frac{p_1}{M_S}}G(X_1(x)-X_1(\hat{x}))\right\|^2 + \left\|\sqrt{\frac{p_2}{M_S}}H(X_2(x)-X_2(\bar{x})) + \sqrt{\frac{p_3}{M_H}}F(X_3(x_R)-X_3(\hat{x}_R^{\prime min}))\right\|^2\right]}}\right)\right.$$

$$\left.Q\left(\sqrt{\frac{1}{2\sigma^2}\left\|\sqrt{\frac{p_1}{M_S}}K(X_1(x)-X_1(x_R))\right\|^2}\right)\right]$$

Here, if it is assumed that $$l = \left\|\sqrt{\frac{p_1}{M_S}}G(X_1(x)-X_1(\bar{x}))\right\|^2 + \left\|\sqrt{\frac{p_2}{M_S}}H(X_2(x)-X_2(\bar{x})) + \sqrt{\frac{p_3}{M_R}}F(X_3(x_R)-X_3(\hat{x}_R^{\prime min}))\right\|^2$$

and $$q = \left\| \sqrt{\frac{p_1}{4M_S}} K(X_1(x) - X_1(x_R)) \right\|^2,$$

the formula 34 can be represented as the following formula 35.

$$E[P(x \to \check{x} \mid x_R) P_{SR}(x_R \mid x)] \le E\left[ Q\left(\frac{l-q}{\sqrt{2\sigma^2 l}}\right) Q\left(\sqrt{\frac{2q}{\sigma^2}}\right) \right] \quad \text{[Formula 35]}$$

Here, if l>q, a Q function will have an upper limit value of $$e^{-\frac{(l-q)^2}{4l\sigma^2}}.$$

Otherwise, the upper limit value is 1. An expected value of the formula 35 has an upper limit value, represented as the following formula 36.

$$E\left[ Q\left(\frac{l-q}{\sqrt{2\sigma^2 l}}\right) Q\left(\sqrt{\frac{2q}{\sigma^2}}\right) \right] \le \int_0^\infty \int_l^\infty e^{-\frac{q}{\sigma^2}} f_q f_l \, dq \, dl + \quad \text{[Formula 36]}$$

$$\int_0^\infty \int_0^l e^{-\frac{q}{\sigma^2}} e^{-\frac{(l-q)^2}{4l\sigma^2}} f_q f_l \, dq \, dl \le$$

$$\int_0^\infty \int_l^\infty e^{-\frac{l+2q}{4\sigma^2}} f_q f_l \, dq \, dl +$$

$$\int_0^\infty \int_0^l e^{-\frac{l+2q}{4\sigma^2}} f_q f_l \, dq \, dl = E\left[ e^{-\frac{l+2q}{4\sigma^2}} \right]$$

Accordingly, the formula 34 can be represented as the following formula 37.

$$E[P(x \to \check{x} \mid x_R) P_{SR}(x_R \mid x)] \le E\left[ e^{-\frac{\left\| \sqrt{\frac{p_1}{M_S}} G(X_1(x)-X_1(\bar{x})) \right\|^2 + \left\| \sqrt{\frac{p_2}{M_S}} H(X_2(x)-X_2(\bar{x})) + \sqrt{\frac{p_3}{M_R}} F\left(X_3(x)-X_3\left(\hat{x}_R^{min}\right)\right) \right\|^2 + \left\| \sqrt{\frac{p_1}{4M_S}} K(X_1(x)-X_1(x_R)) \right\|^2}{4\sigma^2}} \right] \quad \text{[Formula 37]}$$

Moreover, from the formulae 31 and 37, the average pairwise error probability in the formula 24 has an upper limit value, represented as the following formula 38.

$$E[P(x \to \check{x})] \le E\left[ e^{-\frac{\left\| \sqrt{\frac{p_1}{M_S}} G(X_1(x)-X_1(\bar{x})) \right\|^2 + \left\| \sqrt{\frac{p_2}{M_S}} H(X_2(x)-X_2(\bar{x})) + \sqrt{\frac{p_3}{M_R}} F\left(X_3(x)-X_3(\hat{x}_R^{min})\right) \right\|^2}{4\sigma^2}} \right] E\left[ e^{-\frac{\left\| \sqrt{\frac{p_1}{4M_S}} K(X_1(x)-X_1(\hat{x}_R^{min})) \right\|^2}{4\sigma^2}} \right] + \quad \text{[Formula 38]}$$

$$\sum_{x_R \ne x} E\left[ e^{-\frac{\left\| \sqrt{\frac{p_1}{M_S}} G(X_1(x)-X_1(\bar{x})) \right\|^2 + \left\| \sqrt{\frac{p_2}{M_S}} H(X_2(x)-X_2(\bar{x})) + \sqrt{\frac{p_3}{M_R}} F\left(X_3(x)-X_3(\hat{x}_R^{min})\right) \right\|^2}{4\sigma^2}} \right] E\left[ e^{-\frac{\left\| \sqrt{\frac{p_1}{4M_S}} K(X_1(x)-X_1(x_R)) \right\|^2}{4\sigma^2}} \right]$$

In this case, since $\hat{x}_R^{min}$ and $\hat{x}'_R^{min}$ are changed according to the change of K, G, H, and F (i.e., $\hat{x}_R^{min}$ and $\hat{x}'_R^{min}$ are x, $\hat{x}_R$, $x_R$, or other symbol). It is typically impossible to calculate an expected value of the formula 38. However, for the NDF-SAS protocol, the formula 38 can be represented as the following formula 39.

$$E[P(x \to \check{x})] \le E\left[ e^{-\frac{\left\| \sqrt{\frac{p_1}{M_S}} G(X_1(x)-X_1(\bar{x})) \right\|^2}{4\sigma^2}} \right] \left\{ E\left[ e^{-\frac{\left\| \sqrt{\frac{p_2}{M_S}} H(X_2(x)-X_2(\bar{x})) + \sqrt{\frac{p_3}{M_R}} F\left(X_3(x)-X_3(\hat{x}_R^{min})\right) \right\|^2}{4\sigma^2}} \right] E\left[ e^{-\frac{\left\| \sqrt{\frac{p_1}{4M_S}} K(X_1(x)-X_1(\hat{x}_R^{min})) \right\|^2}{4\sigma^2}} \right] + \quad \text{[Formula 39]} \right.$$

$$\left. \sum_{x_R \ne x} E\left[ e^{-\frac{\left\| \sqrt{\frac{p_2}{M_S}} H(X_2(x)-X_2(\bar{x})) + \sqrt{\frac{p_3}{M_R}} F\left(X_3(x)-X_3(\hat{x}_R^{min})\right) \right\|^2}{4\sigma^2}} \right] E\left[ e^{-\frac{\left\| \sqrt{\frac{p_1}{2M_S}} K(X_2(x)-X_1(x_H)) \right\|^2}{4\sigma^2}} \right] \right\}$$

For the NDF protocol, the formula 38 can be represented as the following formula 40.

$$E[P(x \to \tilde{x})] \leq E\left[e^{-\frac{\left\|\sqrt{\frac{P_1}{M_S}} G(X_1(x)-X_1(\tilde{x}))\right\|^2 + \left\|\sqrt{\frac{P_2}{M_S}} H(X_2(x)-X_2(\tilde{x})) + \sqrt{\frac{P_3}{M_R}} F(X_3(x)-X_3(\hat{x}_R^{min}))\right\|^2}{4\sigma^2}}\right] E\left[e^{-\frac{\left\|\sqrt{\frac{P_1}{4M_S}} K(X_1(x)-X_1(\hat{x}_R^{min}))\right\|^2}{4\sigma^2}}\right] +$$

$$\sum_{x_R \neq x} E\left[e^{-\frac{\left\|\sqrt{\frac{P_1}{M_S}} G(X_1(x)-X_1(\tilde{x}))\right\|^2 + \left\|\sqrt{\frac{P_2}{M_S}} H(X_2(x)-X_2(\tilde{x})) + \sqrt{\frac{P_3}{M_R}} F(X_3(x_R)-X_3(\hat{x}_R^{min}))\right\|^2}{4\sigma^2}}\right] E\left[e^{-\frac{\left\|\sqrt{\frac{P_1}{4M_S}} K(X_1(x)-X_1(x_R))\right\|^2}{4\sigma^2}}\right]$$

[Formula 40]

A summation of right-hand side expected values in the parenthesis of the formula 39 has the same diversity order as that of the right-hand side of the following formula 40. Accordingly, the diversity order of the NDF-SAS protocol is greater than that of the NDF protocol by $M_S M_D$.

Next, in the case of the error SR channel, for $M_S = M_R = 1$ and $M_S = M_R = 2$, the average bit error probabilities of the NDF-SAS protocol and the NDF protocol is compared with those of the Alamouti scheme and the CISTBC scheme. Here, conditions of a simulation are identical to that of the aforementioned error-free SR channel. In FIG. 7, when $\sigma^2_{SR} = 10$, $\sigma^2_{SR} = 1$, and $\sigma^2_{SR} = 0.1$, for $M_S = M_R = M_D = 1$, the average bit error probability of the Alamouti scheme for the NDF-SAS protocol and the NDF protocol is compared with that of the error-free SR channel ('NER'). In FIG. 8, when $\sigma^2_{SR} = 10$, $\sigma^2_{SR} = 1$, and $\sigma^2_{SR} = 0.1$ for $M_S = M_R = 2$ and $M_D = 1$, the average bit error probability of the CISTBC scheme for the NDF-SAS protocol and the NDF protocol is compared with that of the error-free SR channel. From FIGS. 7 and 8, when $\sigma^2_{SR} \geq 1$, for $M_D = 1$, the average bit error probability of the error SR channel is similar to that of the error-free SR channel. When $\sigma^2_{SR} = 0.1$, the average bit error probability is different from that of the error-free SR channel. However, the average bit error probability has the same diversity for the NDF-SAS protocol and the NDF protocol. In other words, the diversity of the NDF-SAS protocol is improved by $M_S M_D$.

As described above, the present invention provides a source antenna switching scheme for a non-orthogonal decode-and-forward protocol that can acquire a greater diversity than the conventional NDF protocol. In other words, the present invention provides a source antenna switching scheme for a non-orthogonal decode-and-forward protocol that can increase a diversity order by adding a reasonable priced antenna instead of expensive hardware such as an RF chain when there are a plurality of antenna in the RF chain. Further, the present invention provides a source antenna switching scheme for a non-orthogonal decode-and-forward protocol that can have no loss of encoding rate as compared with a conventional protocol that has a relay node without switching a source antenna even if a source node antenna is switched. In additional, the present invention provides a source antenna switching scheme for a non-orthogonal decode-and-forward protocol that can easily decode a signal transmitted from a source node to a relay node by using a near ML decoding method instead of an ML decoding method.

While the invention has been shown and described with respect to the embodiments, it will be understood by those skilled in the art that various changes and modification may be made without departing from the scope of the invention as defined in the following claims.

What is claimed is:

1. A source antenna switching method for a non-orthogonal protocol that transmits a signal of a source node through at least one RF chain having two transmitting antennas, the source antenna switching method comprising:

selecting one of the two transmitting antennas of the at least one RF chain and allowing the source node to transmit the signal to a relay node and a destination node by using the selected antenna utilizing a total of $M_S$ quantities; and selecting other of the two transmitting antennas and allowing the other antenna in the $M_S$ quantities to cooperate with an antenna of the relay node to transmit a signal to destination node, wherein the $M_S$ quantities are number of RF chains of the source node;

wherein the selecting of the other antenna and allowing the other antenna in the $M_S$ quantities to cooperate with the antenna of the relay node comprises:

allowing the source node and the relay node to generate a distributed space-time code and transmit the generated distributed space-time code to the destination node;

decoding or amplifying the signal received by the relay node; and generating a space-time code by using the decoded or amplified signal to be transmitted by the source node by use of the other antenna in the $M_S$ quantities and transmitting the generated space-time code to the destination node.

2. The source antenna switching method of claim 1, wherein the selecting of the other antenna and allowing the other antenna in the $M_S$ quantities to cooperate with an antenna of the relay node comprises:

decoding the signal by the relay node received from the source node; generating a space-time code by using the decoded signal to be transmitted by the source node by use of the other antenna in the $M_S$ quantities and transmitting the generated space-time code to the destination node; and decoding by using a near ML decoding method a signal that is received through the selecting of one of the two transmitting antennas of the at least one RF chain and allowing the source node to transmit the signal to the relay node and the destination node by using the selected one antenna in the total of $M_S$ quantities and the selecting of the other of the two antennas and allowing the other antenna in the $M_S$ quantities to cooperate with an antenna(s) of the relay node to transmit a signal to destination node.

3. The source antenna switching method of claim 2, wherein the near ML decoding method is performed by a following formula $$\hat{x} = \arg\min_{x \in A^L} \left\{ \left\| Y_{D_1} - \sqrt{\frac{p_1}{M_S}} GX_1(x) \right\|^2 + \min_{\hat{x}_R \in A^L} \left\| Y_{D_2} - \sqrt{\frac{p_{20}}{M_S}} HX_2(x) - \sqrt{\frac{p_3}{M_R}} FX_3(\hat{x}_R) \right\|^2 - [\sigma^2 \ln P_{SR}(x \to \hat{x}_R)] \right\}$$

where G is a channel coefficient matrix of a channel between the source node and the destination node in the selecting of one of the two antennas of the at least one RF chain and allowing the source node to transmit the signal to the relay node and the destination node by using the selected one antenna in the $M_S$ quantities, H is a channel coefficient matrix of a channel between the source node and the destination node in the selecting of the other antenna and allowing the other antenna in the $M_S$ quantities to cooperate with the antenna of the relay node;

F is a channel coefficient matrix of a channel between the relay node and the destination node in the selecting of the other antenna and allowing the other antenna in the $M_S$ quantities to cooperate with the antenna of the relay node, x is L data symbols transmitted from the source node through the selecting of one of the two antennas of the least one RF chain and allowing the source node to transmit the signal to the relay node and the destination node by using the selected one antenna in the $M_S$ quantities and the selecting of the other antenna and allowing the other antenna in the $M_S$ quantities to cooperate with the antenna of the relay node, $M_R$ is a number of transmitting and receiving antennas of the relay node, $X_1(x)$ is a code of $M_S \times T_1$ of the L data symbols, $X_2(x)$ is a code of $M_S \times T_2$ of the L data symbols, $X_3(\hat{x}_R)$ is a code of $M_R \times T_2$ of the L data symbols, the $p_1$ is a power of a signal transmitted from the source node in a first operation, $p_2$ is a power supplied from the source node in a second operation, $p_3$ is a power supplied from the relay node in the second operation, $\sigma^2$ is a power of noise in the relay node and the destination node, $P_{sr}$ is a pairwise error probability, S is the source node, is the relay node, and D is the destination node.

4. The source antenna switching method of claim 1, wherein the two transmitting antennas of the at least one RF chain operate independently from each other.

* * * * *